United States Patent
Ueda et al.

(10) Patent No.: US 6,391,418 B1
(45) Date of Patent: May 21, 2002

(54) SUBSTRATE FOR INFORMATION RECORDING MEDIA

(75) Inventors: Masaya Ueda; Hiroyoshi Maruyama, both of Hiratsuka (JP)

(73) Assignee: Mitsubishi Engineering-Plastics Corp., Tokyo (JP)

( * ) Notice: Subject to any disclaimer, the term of this patent is extended or adjusted under 35 U.S.C. 154(b) by 0 days.

(21) Appl. No.: 09/468,992

(22) Filed: Dec. 21, 1999

(30) Foreign Application Priority Data

Dec. 24, 1998 (JP) .......................................... 10-366276
May 14, 1999 (JP) .......................................... 11-134949
May 14, 1999 (JP) .......................................... 11-134950

(51) Int. Cl.$^7$ ............................. C08L 69/00; C08K 5/01
(52) U.S. Cl. ...................................... 428/64.7; 524/486
(58) Field of Search ........................ 428/64.7; 524/486

(56) References Cited

U.S. PATENT DOCUMENTS 3,945,926 A  * 3/1976 Kesting
4,783,494 A  * 11/1988 Allen
5,977,235 A  * 11/1999 Fujii

FOREIGN PATENT DOCUMENTS

JP    06-179805   *   6/1994
JP    07-092702   *   4/1995

OTHER PUBLICATIONS

Jackson "Antiplasticization" Journal of Applied Polymer Science vol. 11 pp. 211–226, 1967.*
Jurlyn Product Guide, 1980.*
English Abstract of Japanese Patent Publication No. 6–179805, Published Jun. 28, 1994.
"Antiplasticizers for Bisphenol Polycarbonates," Jackson, et al. Advan.Chem. Ser., 48, 185–195 (1965).

* cited by examiner

*Primary Examiner*—David J. Buttner
(74) *Attorney, Agent, or Firm*—Dike, Bronstein, Roberts & Cushman, Intellectual Property Practice Group

(57) ABSTRACT

The present invention relates to a substrate for information recording media, which comprises aromatic polycarbonate resin composition comprising:

100 parts by weight of an aromatic polycarbonate resin having a viscosity-average molecular weight of 10,000 to 40,000, and 0.01 to 40 parts by weight of a biphenyl compound, a terphenyl compound or a mixture thereof.

11 Claims, No Drawings

SUBSTRATE FOR INFORMATION RECORDING MEDIA

BACKGROUND OF THE INVENTION

The present invention relates to substrate for information recording media. More particularly, it relates to an aromatic polycarbonate resin composition which can be used advantageously for the manufacture of OA equipment, automobile parts, optical disc substrates, transparent films and other molded articles which are required to have high transparency, high rigidity, faithful transcription of the fine surface configuration of the stamper to the article surface (which may hereinafter be referred to simply as "transcription ratio" (of the composition)), high proofness against warping and shrinkage after molding and vertical deviation when high-speed rotation. The present invention also relates to a substrate for information recording media such as, typically, optical discs and near field recording media, which is injection molded from an aromatic polycarbonate resin composition, and which is capable of correctly transcribing the grooves and pits of the information signals of the submicron order, has excellent flatness and rigidity, and is highly proof against warp and also minimized in vertical deviation when vibrated.

Aromatic polycarbonate resins have been popularly used as base material for producing various types of fine molded articles such as housings of OA equipment, automobile parts and optical disc-related parts, because of their many excellent properties such as high transparency, impact resistance, heat resistance, etc., and good dimensional stability of their moldings. Also, because of excellent moldability of the aromatic polycarbonate resins, various molding methods known in the art of molding of the thermoplastic resins, such as injection molding, extrusion molding, blow molding, etc., can be used for molding the said articles from the aromatic polycarbonate resins.

Especially the aromatic polycarbonate resins have been prevalently used as starting material for producing the optical disc substrates by injection molding. Since the polycarbonate resins used for the optical discs have relatively low molecular weight, these resins exhibit excellent fluidity and transcription ratio in the manufacture of the optical discs and have been popularly used for molding the substrates for various types of optical discs such as CD (compact disc), CD-R (recordable compact disc), MD (mini-disc), MO (magneto-optical disc), laser disc and DVD.

In recent years, however, in order to increase the signal density, it has been tried to reduce the thickness of the substrate itself or to deepen the pits and grooves of the information signal or to further reduce the interval (pitch) between these pits or grooves and therefore this has made it difficult to faithfully transcribe the stamper signal by use of the conventional polycarbonate resins for optical discs. Further, there has been developed recently an optical disc of the new recording system called near field recording or "first surface" recording system. According to this system, information is recorded and read directly from the surface thereof without mediation of the substrate.

A substrate for near field recording media is injection molded from an aromatic polycarbonate resin. Such information recording media are produced by a method in which using an injection mold called stamper on which the information signals comprising pits and grooves of the depth and pitch of the submicron order have been engraved, a molten thermoplastic resin is injected into the mold cavity attaching the stamper and the information signals are transcribed to the surface of the molded article (substrate).

Aromatic polycarbonate resins have been predominantly used for producing the said substrates for the following reason. This type of resin has high transparency, heat resistance, dimensional stability and impact resistance as well as good moldability, so that when it is used for injection molding the substrate, the fine jagged pattern (information signal) engraved on the stamper is accurately transcribed to the substrate (molded article) surface (good transcription ratio), and a high-quality substrate for information recording media proof against warping and having excellent flatness can be obtained.

Since the laser light is not pass through the inside of disc in near field recording system, transparency of the optical disc substrate is not required. But since a flying head is used, it is required to minimize warp of the substrate taken place during molding thereof and vertical deviation during high-speed rotation for avoiding contact of the flying head with the substrate. Further, because of high signal density, in case where a conventional polycarbonate resin for optical disc is used as base material, it needs to further raise the temperature of the injection mold for improving transcription ratio of the outerside region of the substrate, but rise of the mold temperature enhances the warping tendency of the produced optical disc substrate.

Another problem encountered in molding an optical disc substrate by injection molding is shrinking at the outer peripheral end of the substrate. As the flying head moves at high speed with its distance from the substrate being kept constant, it is imperative to minimize shrinkage at the outer peripheral end of the substrate. If the mold temperature is raised for improving transcription ratio of the stamper signal, its gap from room temperature is widened to encourage shrinkage caused by molding shrinkage. Further, since the polycarbonate resins per se are devoid of vibration-damping properties, use of a polycarbonate resin alone as base material gives rise to the problem of enlarged vertical deviation during high-speed rotation.

Various means, such as addition of a fluidity improver to the polycarbonate resin used as base material, have been proposed for improving transcription ratio of the high-density optical disc substrate, but there is yet available no idea that can satisfy all of the requirements for high transcription ratio, small warping, small shrinkage and excellent vibration-damping. A known method of affording vibration-damping properties to the optical disc substrate is to increase rigidity of the substrate. A typical method of increasing rigidity of the optical disc substrate is to add a filler such as glass fiber or other inorganic filler to the polycarbonate resin used as base material. But this method has the problem that the added filler might come out to the substrate surface to obstruct correct transcription of the signal. Therefore, it is not suitable to try to improve rigidity by adding a filler.

It is well known to add a thermoplastic elastomer to the polycarbonate resin used as base material for improving the vibration-damping properties of the high-density optical disc substrate (Japanese Patent No. 2,835,596). Addition of a thermoplastic elastomer to the polycarbonate resin can indeed improve the vibration-damping properties of the produced optical disc substrate, but it is incapable of improving transcription ratio and resistance against warping and shrinkage as well.

Further, there has been, in recent years, an increasing tendency to elevate the information recording density by, for instance, reducing the thickness of the substrate itself or deepening the pits and grooves of the information signal or by further reducing the interval (pitch) between the pits and/or the grooves for the purpose of increasing signal density of the substrate, but such tendency has added to the difficulty in effecting correct transcription of signal to the injection molded substrate. Further, requirement for flatness of the substrate, especially in the near field recording media, has intensified as so have the requirements for minimized warp of the substrate and suppressed vertical deviation when the substrate is vibrated.

When the thickness of the substrate itself is reduced, in case where fluidity of the resin used as base material for injection molding is low, transcription ratio of information signal tends to deteriorate, and also rigidity of the substrate tends to lower as the thickness is reduced, resulting in enlarged warp and vertical deviation of the substrate. Large warp of the substrate leads to corresponding enlargement of the angle of reflection of the laser light, making it unable to detect such angle of reflection by a detector or making it difficult to bond two pieces of substrate as in the DVD. Also, in the near field recording media, since read and write directly from and to the surface are conducted under high-speed rotation, it is essential that the vertical deviation of the substrate during high-speed rotation be confined to the minimum.

Since the substrate (molded article) molded from an aromatic polycarbonate resin alone is lower in rigidity than the metal or glass substrate, an additive or additives such as glass fiber or inorganic filler is blended in the base resin for improving rigidity. It is known that warp and vertical deviation of the substrate are lessened if rigidity is enhanced by blending of an additive or additives. In this case, the additive is blended in an amount of usually 20 parts by weight or more based on 100 parts by weight of the aromatic polycarbonate resin. However, blending of an additive such as inorganic filler involves the problem that transparency of the product, which is a characteristic of aromatic polycarbonate resin, is impaired because of the difference in refractive index between the additive and the aromatic polycarbonate resin.

Blending of an additive such as mentioned above also has drawbacks in that fluidity of the base resin is lowered by the influence of the additive, and that transcription ratio of information signal comprising high-density grooves and pits is deteriorated. It has been proposed to blend polycaprolactone of an aromatic polycarbonate resin as base resin for the purpose of improving transparency (Japanese Patent Application Laid-Open (KOKAI) No. 6-228424), but the desired effect can not be obtained if the content of the additive such as inorganic filler blended for the purpose of improving rigidity is increased.

Additives such as inorganic filler indeed serve for improving rigidity of the aromatic polycarbonate resin, but they are liable to lower fluidity of the resin when injection molded, resulting in a reduced transcription ratio. Such additives also tend to come out on the molding surface, often impairing appearance of the substrate. The additives with high anisotropy, such as glass fiber, are oriented in the flow direction during injection molding, so that the molded article tends to warp especially when it is a thin-gage article such as optical disc substrates. For the improvement of surface properties of the substrate containing an additive such as glass fiber, several methods have been proposed, such as: (a) adding a phthalic acid-based plasticizer; and (b) adding an oligomer of an aromatic polycarbonate. These methods are known to be effective for the intended purpose, but they are defective in that the substrate is reduced in rigidity and/or heat resistance, causing enlarged vertical deviation during high-speed rotation.

Also, when an additive such as inorganic filler is blended in the basic resin, although rigidity of the resin is improved, its fluidity and moldability are lowered by the influence of the additive, resulting in a deteriorated transcription ratio of the surface configuration of the stamper to the surface of the molded article. Hitherto, there has been realized no aromatic polycarbonate resin which can satisfy both of the requirements for improvement of transcription ratio of the jagged surface configuration of the mold cavity to the molded article surface and minimization of warping. In other words, there has yet been found no technique with which to improve rigidity of the aromatic polycarbonate resin while improving at the same time all of the other property requirements such as transparency, moldability and transcription ratio.

The transparent substrates for the optical discs such as compact disc (CD) and digital versatile disc (DVD) have been generally produced by injection molding using an aromatic polycarbonate resin as base material, but the substrates are required to be capable of correctly transcribing the fine surface configuration of the stamper having the pits and grooves of the submicron order to the molded article surface. However, it is necessary to reduce the thickness of the substrate itself for the purpose of increasing signal density, and further it needs to raise signal density of the substrate surface. For raising signal density of the substrate surface, it is essential to increase the depth of the pits and grooves or to reduce the interval between the pits and between the grooves, but the fine configuration with the increased depth of pits and grooves and the reduced pit and groove intervals is very difficult to transcribe to the substrate surface.

There are known several methods for correctly transcribing the fine configuration to the substrate surface of the molded article (improved transcription ratio), such as: (1) The mold temperature is set high in the substrate manufacturing process; (2) The glass transition temperature of the aromatic polycarbonate resin used is lowered. The method (1), however, has the problem that the high mold temperature encourages warping of the substrate. According to the method (2), since the resin lowered in its glass transition temperature is also reduced in rigidity, warping of the substrate is also promoted.

As viewed above, there has yet been available no substrate for information recording media which can meet the said requirements for faithful transcription, high rigidity and minimized warp and vertical deviation.

As a result of the present inventors' earnest studies to solve the above problem, it has been found that by blending a specified amount of a specific biphenyl compound and/or a terphenyl compound in a polycarbonate resin, it is possible to enhance rigidity of the base resin while maintaining its excellent transparency, and quite surprisingly, to lower the mold temperature as a result of reduced glass transition temperature of the base resin, and this makes it possible to shorten the molding cycle, to correctly transcribe the signal shape of the stamper surface to the product optical disc substrate surface, thus remarkably improving transcription ratio, and to also improve the vibration-damping properties of the optical disc substrate.

The present invention has been attained on the basis of the above finding.

SUMMARY OF THE INVENTION

The present invention has the following objects:
(1) To provide an aromatic polycarbonate resin composition having excellent transparency and rigidity as well as good transcription ratio of the stamper configuration to the molded article surface in the molding operation.

(2) To provide an aromatic polycarbonate resin composition capable of providing a molded article with minimized warp and shrinkage.

(3) To provide an aromatic polycarbonate resin composition capable of providing an optical disc substrate with good transcription and minimized warp and shrinkage.

(4) To provide an aromatic polycarbonate resin composition capable of providing an optical disc substrate with excellent vibration-damping properties.

(5) To provide an aromatic polycarbonate resin composition which enables shortening of the molding cycle in the manufacture of an optical disc substrate.

(6) To provide a substrate for information recording media such as optical disc and near field recording media.

(7) To provide a substrate for information recording media to which the information signal comprising high-density grooves and pits engraved on a stamper have been correctly transcribed.

To attain the above aim, in the first aspect of the present invention, there is provided a substrate for information recording media, which comprises aromatic polycarbonate resin composition comprising:

100 parts by weight of an aromatic polycarbonate resin having a viscosity-average molecular weight of 10,000 to 40,000, and 0.01 to 40 parts by weight of a biphenyl compound, a terphenyl compound or a mixture thereof.

In the second aspect of the present invention, there is provided a substrate for information recording media, which comprises aromatic polycarbonate resin composition comprising:

100 parts by weight of an aromatic polycarbonate resin having a viscosity-average molecular weight of 10,000 to 40,000, 0.01 to 40 parts by weight of a biphenyl compound, a terphenyl compound or a mixture thereof, and 0.5 to 50 parts by weight of a thermoplastic elastomer having a glass transition temperature between −50° C. and 50° C.

In the third aspect of the present invention, there is provided a substrate for information recording media, which comprises aromatic polycarbonate resin composition comprising:

100 parts by weight of an aromatic polycarbonate resin having a viscosity-average molecular weight of 10,000 to 40,000, 0.01 to 40 parts by weight of a biphenyl compound, a terphenyl compound or a mixture thereof, and 0.5 to 50 parts by weight of an ethylene-unsaturated carboxylic acid copolymer which is intra-molecules crosslinked by a mono- to trivalent metal ion.

In the fourth aspect of the present invention, there is provided an aromatic polycarbonate resin composition comprising:

100 parts by weight of an aromatic polycarbonate resin having a viscosity-average molecular weight of 10,000 to 40,000, and 0.01 to 40 parts by weight of (A) a biphenyl compound represented by the following formula (1), (B) a non-substituted terphenyl compound or (C) a mixture of a biphenyl compound and a terphenyl compound,

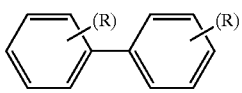

where in the structural formula (1), R represents a hydrogen atom or a chlorine atom.

In the fifth aspect of the present invention, there is provided an aromatic polycarbonate resin composition as defined in the fourth aspect, further comprising 0.5 to 50 parts by weight of a thermoplastic elastomer having a glass transition temperature between −50° C. and 50° C.

In the sixth aspect of the present invention, there is provided an aromatic polycarbonate resin composition as defined in the fourth aspect, further comprising 0.5 to 50 parts by weight of an ethylene-unsaturated carboxylic acid copolymer which is intra-molecules crosslinked by a mono- to trivalent metal ion.

DETAILED DESCRIPTION OF THE INVENTION

The present invention is described in detail below.

The basic resin of the resin composition according to the present invention is an aromatic polycarbonate resin. The aromatic polycarbonate resins used in the present invention are the polymers or copolymers obtained by a phosgene method which comprises reacting a dihydroxydiaryl compound with phosgene, or an ester exchange method which comprises reacting a dihydroxydiaryl compound with a carbonic acid ester such as diphenyl carbonate. A typical example of such aromatic polycarbonate resins is the polycarbonate resin produced from 2,2-bis(4-hydroxyphenyl) propane (bisphenol A).

Examples of the dihydroxyaryl compounds usable for the said purpose include, besides bisphenol A mentioned above, bis(hydroxyaryl)alkanes such as bis(4-hydroxydiphenyl) methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-tert-butylphenyl)propane, 2,2-bis(4-hydroxy-3-bromophenyl) propane, 2,2-bis(4-hydroxy-3,5-dibromophenyl)propane, and 2,2-bis(4-hydroxy-3,5-dichlorophenyl)propane; bis (hydroxyaryl)cycloalkanes such as 1,1-bis(4-hydroxyphenyl)cyclohexane; dihydroxyaryl ethers such as 4,4'-dihydroxydiphenyl ether and 4,4'-dihydroxy-3,3'-dimethyldiphenyl ether; dihydroxydiaryl sulfides such as 4,4'-dihydroxyphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3, 3'-dimethyldiphenyl sulfoxide; and dihydroxydiarylsulfones such as 4,4'-dihydroxydiphenylsulfone and 4,4'-dihydroxy-3,3'-dimethyldiphenylsulfone. These compounds may be used either singly or as a mixture of two or more of them, or may be mixed with other compounds such as piperazine, dipiperidine, hydroquinone, resorcine and 4,4'-dihydroxydiphenyl.

The viscosity-average molecular weight of the basic aromatic polycarbonate resin falls within the range of 10,000 to 40,000. If the viscosity-average molecular weight is less than 10,000, the resin may be too low in rigidity and unable to provide a molded article with enough practicality. If the viscosity-average molecular weight exceeds 40,000, the resin has poor fluidity and may not provide a molded article with good transcription ratio of the mold cavity surface configuration. The preferred range of viscosity-average molecular weight of the said resin is from 12,000 to 35,000, more preferably from 13,000 to 30,000. The "viscosity-average molecular weight (M)" referred to in the present invention is the value obtained from the following Schnell's viscosity formula after determining the intrinsic viscosity (η) by Ostwald's viscometer using methylene chloride as solvent:

$$(\eta) = 1.23 \times 10^{-5} M^{0.85}$$

A biphenyl compound and/or a terphenyl compound are blended in the said basic aromatic polycarbonate resin. According to the experiments, it has been found, quite surprisingly, that when the biphenyl compound and/or terphenyl compound are blended in the basic resin, rigidity of the resin is enhanced while keeping its excellent transparency unchanged, and also the glass transition temperature of the basic resin is lowered to improve fluidity of the resin in the optical disc substrate manufacturing process, thereby remarkably improving transcription ratio of the molding to allow correct transcription of the signal shape of the stamper surface. It has been further found that since resin rigidity is enhanced, warping of the produced optical disc substrate is lessened, and since the glass transition temperature is lowered, it becomes possible to lower the injection mold temperature, which has the effect of enabling shortening of the molding cycle and minimizing shrinkage at the outermost region of the produced optical disc substrate.

The biphenyl compounds used in the present invention are the compounds having two benzene rings coupled to each other, which may have a substituent such as chlorine atom. They are preferably the compounds represented by the following structural formula (1). The terphenyl compounds used in the present invention are the compounds having three benzene rings coupled to each other, which may have a substituent such as chlorine atom. Preferred examples of such terphenyl compounds are the ortho-terphenyl compounds represented by the following structural formula (2), the meta-terphenyl compounds represented by the following structural formula (3), and the para-terphenyl compounds represented by the following structural formula (4).

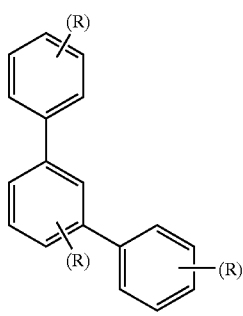
(1)

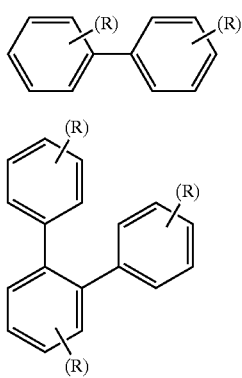
(2)

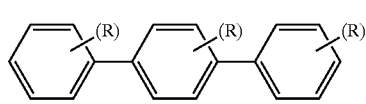
(3)

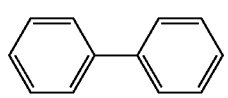
(4)

In the structural formulas (1) to (4), R represents a as hydrogen atom or a chlorine atom. Since in case where R is a chlorine atom, a reflective layer formed on the substrate may be corroded, R is preferably a hydrogen atom as shown in the following structural formulas (5) to (8).

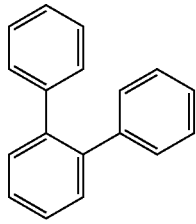
(5)

(6)

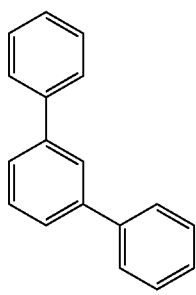
(7)

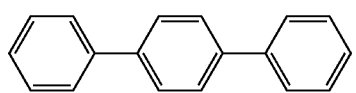
(8)

Among the terphenyl compounds, the meta-terphenyl compounds are especially preferred. The reason why the meta type is especially effective is not known, but such preference is considered attributable to the mutual interaction associated with the molecular arrangement of the meta-type triphenyl compound and the basic aromatic polycarbonate resin, and the increased plasticization effect.

Regarding the interaction between the basic aromatic polycarbonate resin and the biphenyl compound and/or terphenyl compound, it is noted that the resin composition of the present invention comprising a blend of the basic resin and a biphenyl compound and/or a terphenyl compound has high rigidity at room temperature, but the interaction between the basic resin and the additive is mitigated at a temperature above 100° C., and probably because of the plasticizing effect of the additive, the glass transition temperature of the basic resin is lowered to improve its moldability. For instance, the flexural modulus of an aromatic polycarbonate resin having a viscosity-average molecular weight of 16,000 is about 22,000 kgf/cm$^2$, but when a meta-terphenyl compound is blended in an amount of 1 part by weight, the flexural modulus of the resin composition elevates to about 25,000 kgf/cm$^2$. Further, the flexural modulus of an aromatic polycarbonate resin having a viscosity-average molecular weight of 200,000 is 24,000 kgf/cm$^2$, but when a biphenyl compound and/or a terphenyl compound is blended in an amount of 5 parts by weight to form a resin composition, its flexural modulus becomes as high as 28,000 kgf/cm$^2$.

The glass transition temperature of the aromatic polycarbonate resins is around 140 to 150° C., but the resin composition of the present invention comprising a basic resin and a biphenyl compound and/or a terphenyl compound lowers in its glass transition temperature depending on the amount of such an additive compound(s) blended. For instance, when one part by weight of a meta-terphenyl compound is blended in the aromatic polycarbonate resin, the glass transition temperature lowers to around 7° C. Also, when 5 parts by weight of a terphenyl compound is blended in the aromatic polycarbonate resin, the glass transition temperature drops to around 10° C. Reduction of the glass transition temperature of the resin composition has the same effect as provided when the mold temperature is raised, that is, it markedly improves transcription ratio of the information signal of the mold cavity surface to the substrate surface.

When blending a biphenyl compound and/or a terphenyl compound in the basic resin, these compounds may be blended either singly or as a mixture. The amount of a biphenyl compound and/or a terphenyl compound to be blended in the basic resin is selected from within the range of 0.01 to 40 parts by weight based on 100 parts by weight of the aromatic polycarbonate resin. When the amount of the additive compound(s) blended is less than 0.01 part by weight, the rigidity improving effect and the effect of reducing the glass transition temperature may be insignificant, while when the compound amount exceeds 40 parts by weight, these effects become saturated and no further improvement can be expected. The especially preferred range of the compound amount is from 0.05 to 30 parts by weight, even more preferably from 0.1 to 20 parts by weight.

In case of using a chlorinated terphenyl compound, the chlorine content in the terphenyl compound is preferably in excess of 20% by weight, most preferably in the range from 40 to 70% by weight.

In the present invention, it is preferred to blend, in addition to a terphenyl compound, a thermoplastic elastomer whose glass transition temperature (Tg) is between –50° C. and 50° C., with basic aromatic polycarbonate resin. Blending of a thermoplastic elastomer is conducive to the improvement of vibration-damping properties of the optical disc substrate at or around room temperature. The thermoplastic elastomers usable for the above purpose include conjugated diene rubbers such as butadiene rubber and isoprene rubber, ethylene-conjugated diene block copolymer and its hydrogenation product, ethylene-α-olefin copolymer rubber, nylon-based elastomers, silicone resin-based elastomers, fluorine resin-based elastomers, and core-shell type elastomers.

Preferred among these thermoplastic elastomers are conjugated diene rubber, styrene-conjugated diene block copolymer and their hydrogenated products. Especially preferred are styrene-isoprene-conjugated diene block copolymer containing not less than 50% by weight of the structural units having 1,2-vinyl structure and/or 3,4-vinyl structure, and its hydrogenation product. Blending of these specific thermoplastic elastomers contributes to the improvement of vibration-damping properties of the optical disc substrate at and around room temperature and reducing the vertical deviation when high-speed rotation, while hydrogenation of the unsaturated bonds provides excellent heat stability in high-temperature molding.

The amount of the thermoplastic elastomer to be blended is usually selected from the range of 0.5 to 50 parts, preferably 3 to 30 parts by weight based on 100 parts by weight of the basic aromatic polycarbonate resin. If the amount of the thermoplastic elastomer blended is less than 0.5 part by weight, improvement of the vibration-damping properties may not be expected, and if the elastomer amount exceeds 50 parts by weight, rigidity of the composition may drop to the impractical level.

In the present invention, it is preferred to blend, besides a terphenyl compound, an ethylene-unsaturated carboxylic acid copolymer which has undergone intermolecular crosslinkage by a mono- to trivalent metallic ion, with aromatic polycarbonate resin. (This copolymer may hereinafter be referred to as "ionomer resin".) The presence of this ionomer resin contributes to the improvement of vibration-damping properties of the optical disc substrate at and around room temperature and reducing the vertical deviation when high-speed rotation. The unsaturated carboxylic acid moiety in the ionomer resin is preferably acrylic acid or methacrylic acid, and the mono- to trivalent metallic ion may be, for instance, sodium ion, potassium ion, magnesium ion or zinc ion.

Preferred examples of the said ionomer resin are the ethylene and acrylic acid and/or methacrylic acid copolymers containing zinc ions, whose melt index thereof as measured according to ASTM D-1238 is 0.3 to 3.0 g/10 min. When the melt index is less 0.3 g/10 min., moldability of the basic resin composition blended with the said ionomer resin may be deteriorated, and when the melt index is more than 3.0 g/10 min., the composition may lack in heat resistance. Preferably 10 to 90 mol %, more preferably 30 to 70 mol % of the carboxylic acid moiety of the ionomer resin is neutralized with zinc, and the molecules of the resin are preferably crosslinked through the zinc ions.

The amount of the ionomer resin to be blended is usually 0.5 to 50 parts, preferably 3 to 30 parts by weight based on 100 parts by weight of the basic resin. When the amount of the ionomer resin blended is less than 0.5 part by weight, improvement of vibration-damping properties may not be expected, and when its amount exceeds 50 parts by weight, rigidity of the composition may lower to the impractical level.

In the aromatic polycarbonate resin composition according to the present invention, various types of resin additives such as flame retardant, flame-retarding assistant, colorant, plasticizer, lubricant, heat stabilizer, antistatic agent, releasing agent, ultraviolet absorber, weathering agent, etc., may be added as required within limits not prejudicially to the object of the present invention. The aromatic polycarbonate resin composition according to the present invention can be produced by a method in which the measured amounts of the biphenyl compound and/or the terphenyl compound, optionally the conjugated diene compound and/or the ionomer resin, if necessary, a resin additive or additives such as mentioned above are mixed with the basic aromatic polycarbonate resin by, for example, a V-type blender, and the mixture is melted, kneaded and granulated by preferable means such as extruder, Banbury mixer, roll mill, Brabender Plastograph and the like.

The substrate for information recording media according to the present invention can be produced by injection molding the said basic resin composition. The cylinder temperature and mold temperature of the injection molding machine used in the molding operation can be properly selected depending on the information signal density and the required proofness against warping and vertical deviation. In the injection molding operation, a stamper engraved with the information signals of pits and grooves of submicron depths is attached on one or both sides of the mold cavity, with the stamper attached, and by setting the cylinder temperature of the molding machine in the range of usually 250 to 400° and the mold temperature in the range of usually 50 to 150°, preferably 50 to 140° C., the molten resin is injected into the mold cavity to mold a substrate (molded article) to which the information signals have been transcribed. Use of the injection/compression molding techniques in this molding operation provides further improvement of transcription ratio.

The substrate may be transparent or opaque. It needs to be transparent in case where it is of the type in which laser is passed through the inside, such as optical disc substrates. The substrate may be opaque in case where read or recording is made directly from the surface by laser as in near field recording. That is, in the case of a transparent substrate, read and write of information is generally made trough the substrate, and in the case of an opaque substrate, read and write of information is made from the surface thereof. Thickness of the substrate diminishes as the information signal density elevates, but with the substrate for information recording media according to the present invention, it is possible to produce an information recording medium as a final product by using a single substrate which is 0.3 to 1.5 mm thick or by combining two pieces of this substrate.

The substrate according to the present invention can be used as a substrate for various types of information recording media, for example, optical discs such as compact disc, laser disc, magneto-optical disc, DVD, etc., and near field recording media in which read and write of information signal is made from the surface thereof. For application to the optical discs, a single transparent substrate or a bonding of two pieces of such substrate is used, and in application to the near field recording media, a bonding of two pieces of opaque substrate or a single opaque substrate is used. With the substrate for information recording media according to the present invention, it is possible to read and write the information signal from the surface of the opaque substrate by using laser with a wavelength in the range of 300 to 800 nm, preferably 385 to 780 nm.

Having been described above in detail, the present invention can produce the specific advantageous effects such as stated below, hence its industrial utility value is very high.

(1) The aromatic polycarbonate resin composition according to the present invention is capable of providing the molded articles having excellent rigidity and transparency that are unobtainable with the conventional aromatic polycarbonate resins, so that the resin composition according to the present invention can be widely used as a base resin for manufacturing various types of fine molded articles such OA equipment housing parts, automobile parts and optical disc-related parts.

(2) The aromatic polycarbonate resin composition according to the present invention is lower in glass transition temperature than the single form of aromatic polycarbonate resins, so that use of this resin composition improves transcription ratio of the fine configuration of the stamper to the molded article surface, and the composition is especially preferred for use as a material for fine molded articles such as optical discs.

(3) The substrate for information recording media according to the present invention has high rigidity and resistance to warping and vertical deviation, so that it is preferred for producing the optical discs or near field recording media which are minimized in vertical deviation when vibrated under high-speed rotation.

(4) The substrate for information recording media according to the present invention has correct transcription of information signal of high-density grooves and pits engraved on the stamper, so that it can provide the optical discs and near field recording media of high information recording density and the optical discs preferred for the new recording system called "first surface" recording.

(5) The aromatic polycarbonate resin composition according to the present invention contains a terphenyl compound, so that the glass transition temperature of the resin is lowered allowing the composition to maintain good fluidity even at low temperatures, and as it is made possible to set the cylinder temperature and mold temperature at a relatively low level when an optical disc substrate is manufactured by injection molding, the produced substrate is highly proof against warping and shrinkage.

(6) The aromatic polycarbonate resin composition according to the present invention contains the conjugated diene elastomer or ionomer resin, so that the composition is enhanced in rigidity and capable of producing an optical disc substrate with excellent vibration-damping properties.

(7) The aromatic polycarbonate resin composition according to the present invention makes it possible to set the cylinder temperature and mold temperature at a relatively low level in production of the optical disc substrates, so that the molding cycle can be shortened to greatly enhance productivity.

EXAMPLES

The present invention is described in further detail with reference to the following examples, which examples, however, are merely intended to be illustrative and not to be construed as limiting the scope of the invention.

The materials used in the following Examples and Comparative Examples are listed below.

Aromatic polycarbonate resin: Novarex 7020AD2 (trade name, produced by Mitsubishi Engineering-Plastics Corporation), a polycarbonate for optical disc with a viscosity-average molecular weight of 16,000

Biphenyl, meta-terphenyl and ortho-terphenyl: products by Tokyo Kasei KK

Glass fiber: Chopped Strand ECR (trade name, produced by Asahi Fiber Glass Co., Ltd.)

Conjugated diene-based elastomer: HYBRAR VS-1 (trade name, produced by Kuraray Co., Ltd.; Tg=8° C.), a styrene-isoprene-styrene block copolymer in which the content of 1,2-vinyl structural unit and 3,4-vinyl structural-unit is 70 wt %.

Conjugated diene elastomer used in Comparative Example 2: Clayton G1651 (trade name, produced by Shell Chemical Co.; Tg=−60° C.), a styrene-butadiene block copolymer in which the content of 1,2-vinyl structural unit and 3,4-vinyl structural unit is 0 wt %.

Ionomer resin: 1855 (trade name, produced by Mitsui Du Pont Polychemical Co., Ltd.; MI=1.0 g/10 min; metal ion=zinc)

The optical disc substrates obtained in the following Examples and Comparative Examples were subjected to the evaluation tests concerning the following items.

(1) Flexural Modulus (kgf/cm$^2$)

Measured according to ASTM D-790

(2) Glass Transition Temperature (°C.)

The pellets were heated at a rate of 10° C./min from room temperature in a nitrogen stream by DSC (Model SSC-5000 mfd. by Seiko Co., Ltd.), and the point of inflection was measured and shown as glass transition temperature.

(3) Overall Light Transmittance

Measured according to JIS K-7105 using a disc test piece measuring 120 mm in diameter and 1.2 mm thick.

(4) Evaluation of Transcription Ratio of Information Signal (Groove Depth: nm)

A 0.6 mm thick and 120 mm-diameter optical disc substrate was molded using a stamper with a groove depth of 200 nm (in Table 2) and 160 nm (in Tables 3 and 4) and a pitch of 0.74 μm, and the groove depth was measured at four spots along the circumference at a distance of 57 mm (in Table 2) and 58 mm (in Tables 3 and 4) in the radial direction from the center of this optical disc substrate. A greater numerical value signifies better transcription ratio of information signal. Measurement was made by using an atomic force microscope (NV2100 mfd. by Olympus Co., Ltd.) under the following conditions:

Cantilever: conical

Load: 30 nm

Number of scanning lines: 128

Scanning speed: 5 sec/line (5) Measurement of Warpage (Tilt Angle) and Vertical Deviation of the Substrate The optical disc substrate was turned at a speed of 60 rpm and laser light with a wavelength of 780 nm from a semiconductor laser was applied to the four spots along the circumferences at the distances of 25 mm, 37 mm, 49 mm and 57 mm in the radial direction from the center of the substrate, measuring the tilt angle and vertical deviation of the substrate by an automatic disc tilt angle measuring device (mfd. by Adomon Science Co., Ltd.). The maximal values of the measurements were shown as the tilt angle (degree) in the radial direction, the tilt angle (degree) in the tangential direction and the amount of vertical deviation. The smaller the numerical value, the better.

(6) Shrinkage (μm)

The positions of the outermost region at the distances of 58 to 60 mm in the radial direction from the center of the optical disc substrate were scanned by a laser displacement meter (mfd. by Keyence Co., Ltd.), and the distance from the portion with the greatest displacement in comparison with the horizontal portion was regarded as the size of shrinkage.

(7) Vibration-damping Properties

Using a dynamic viscoelastic measurement (mfd. by Toyo Baldwin Co., Ltd.), tan δ was determined at a frequency of 11 Hz and a heating rate of 2° C./min, and the maximum point at temperatures below 100° C. was determined.

Examples 1 to 5 and Comparative Examples 1 to 3

To 100 parts by weight of a basic aromatic polycarbonate resin, an additive (or additives) was weighed and added in the ratios (parts by weight) shown in Table 1 and mixed with the basic resin by a tumbler, and the mixture was melted, kneaded and pelletized by a 40 mm φ vented extruder at a cylinder temperature of 270° C. The produced pellets were molded by an injection molding machine (SG75 mfd. by Sumitomo Heavy Machinery Co., Ltd.) at a cylinder temperature of 290° C. and a mold temperature of 90° C. to make the test pieces, and they were evaluated by the method described above. The results are shown in Table 1.

TABLE 1

|  | Example 1 | Example 2 | Example 3 | Example 4 | Comp. Example 1 | Comp. Example 2 |
| --- | --- | --- | --- | --- | --- | --- |
| Additive | Biphenyl | Ortho-terphenyl | Meta-terphenyl | meta-terphenyl | None | Glass fiber |
| Amount added (parts by weight) | 1 | 1 | 1 | 10 | 0 | 20 |
| Flexural modulus (kgf/cm$^2$) | 24,500 | 25,000 | 25,500 | 33,000 | 22,000 | 42,000 |
| Glass transition temperature (° C.) | 141 | 140 | 138 | 121 | 145 | 146 |
| Overall light transmittance (%) | 90 | 85 | 89 | 81 | 92 | 73 |

The following facts are clearly recognized from Table 1.

(1) The aromatic polycarbonate resin compositions (Examples 1 to 5) according to the present invention, as compared with an aromatic polycarbonate resin alone (Comparative Example 1), is lower in glass transition temperature, and yet is higher in rigidity and not much lower in transmittance.

(2) On the other hand, the resin composition prepared by blending glass fiber alone in the basic resin (Comparative Example 2), although improved in rigidity, is markedly reduced in light transmittance.

Examples 5 to 7 and Comparative Examples 3 to 5

To 100 parts by weight of a basic aromatic polycarbonate resin, an additive (or additives) was weighed and added in the ratios (parts by weight) shown in Table 2 and mixed with the basic resin by a tumbler, and the mixture was melted, kneaded and pelletized by a 40 mm φ vented extruder at a cylinder temperature of 270° C. The pellets were molded by an injection molding machine (DISK3 mfd. by Sumitomo Heavy Machinery Co., Ltd.) having an optical disc substrate mold at a cylinder temperature of 380° C. and a mold temperature of 118° C. to mold the transparent optical disc substrates. The produced disc substrates were evaluated by the method described above, obtaining the results shown in Table 2.

TABLE 2

|  | Example 5 | Example 6 | Example 7 | Comp. Example 3 | Comp. Example 4 | Comp. Example 5 |
|---|---|---|---|---|---|---|
| Additive | Meta-terphenyl | Ortho-terphenyl | Meta-terphenyl | None | Glass fiber | Polycaprolactone |
| Amount added (parts by weight) | 1 | 5 | 10 | 0 | 20 | 2 |
| Flexural modulus (kgf/cm$^2$) | 25,500 | 26,500 | 33,000 | 22,000 | 42,000 | 20,000 |
| Glass transition temperature (° C.) | 138 | 134 | 121 | 145 | 146 | 135 |
| Groove depth (nm) | 100 | 110 | 130 | 10 | 5 | 35 |
| Tilt angle in the radial direction (degree) | 1.23 | 0.51 | 0.33 | 0.62 | 0.23 | 1.62 |
| Tilt angle in the tangential direction (degree) | 0.17 | 0.07 | 0.06 | 0.07 | 0.02 | 0.13 |
| Vertical deviation ($\mu$m) | 92 | 79 | 62 | 88 | 33 | 121 |

The following facts are clearly recognized from Table 2.

(1) The substrates for information recording media according to the embodiments of the present invention (Examples 5 to 7) are higher in rigidity but yet are lower in glass transition temperature and better in transcription ratio of information signal than the substrate comprising an aromatic polycarbonate resin alone (Comparative Example 3).
(2) The substrates for information recording media according to the embodiments of the present invention (Examples 5 to 7) are small in tilt angle in the radial direction, tilt angle in the tangential direction and vertical deviation.
(3) On the other hand, the substrate of Comparative Example 4 where glass fiber was blended, although having excellent rigidity, is high in glass transition temperature and very poor in transcription ratio of information signal.

Examples 8 to 10 and Comparative Examples 6 and 7

To 100 parts by weight of a basic aromatic polycarbonate resin, an additive was weighed and added in the ratios shown in Table 3 and mixed with the basic resin by a tumbler, and the mixture was melted, kneaded and pelletized by a 40 mm φ vented extruder at a cylinder temperature of 270° C. The pellets were molded into the 12 cm-diameter, 0.6 mm thick optical disc substrates by an injection molding machine (SD40 mfd. by Sumitomo Heavy Industry Co., Ltd.) at a cylinder temperature of 360° C. A stamper with a groove depth of 160 nm was used. The produced disc substrates were evaluated in the manner described above. The results are shown in Table 3.

TABLE 3

|  | Example 8 | Example 9 | Example 10 | Comp. Example 6 | Comp. Example 7 |
|---|---|---|---|---|---|
| Neta-terphenyl (wt%) | 5 | 10 | 10 | 0 | 0 |
| SIS |  |  |  |  |  |
| Tg (° C.) | 8 | 8 | 8 | — | 8 |
| Amount added (wt %) | 5 | 5 | 10 | 0 | 5 |
| Content of 1, 2 and 3, 4 structural units (wt %) | 75 | 75 | 75 | — | 75 |
| Mold temperature in molding of substrate (° C.) | 98 | 90 | 90 | 128 | 128 |
| Groove depth (nm) | 160 | 160 | 160 | 30 | 30 |
| Tilt angle (degree) | 0.3 | 0.3 | 0.3 | 0.8 | 1.0 |
| Shrinkage ($\mu$m) | 3 | 3 | 3 | 5 | 7 |
| tan δ | 0.018 | 0.018 | 0.025 | 0.012 | 0.018 |

The following facts are clearly recognized from Table 3.
(1) The optical disc substrates molded from the aromatic polycarbonate resin compositions according to the present invention (Examples 8 to 10) have better transcription ratio and vibration-damping properties and smaller warp and shrinkage than the substrate molded from an aromatic polycarbonate resin alone (Comparative Example 6).
(2) On the other hand, the resin composition obtained by blending SIS alone in the basic resin (Comparative Example 7), although improved in vibration-damping properties, is unsatisfactory in transcription ratio and proofness against warping and shrinkage.

Examples 11 to 13 and Comparative Examples 8 and 9

The optical disc substrates were molded by the same operations as in the previous examples except for change of the additive as shown in Table 4, and the obtained disc substrates were evaluated in the manner described above. The results are shown in Table 4.

TABLE 4

|  | Example 11 | Example 12 | Example 13 | Comp. Example 8 | Comp. Example 9 |
|---|---|---|---|---|---|
| Meta-terphenyl (wt %) | 5 | 10 | 10 | 0 | 0 |
| Ionomer resin (wt %) | 5 | 5 | 10 | 0 | 5 |
| Mold temperature in molding of substrate (° C.) | 98 | 90 | 90 | 128 | 128 |
| Groove depth (nm) | 160 | 160 | 160 | 30 | 30 |
| Tilt angle (degree) | 0.3 | 0.3 | 0.3 | 0.8 | 1.0 |
| Shrinkage (μm) | 3 | 3 | 3 | 5 | 7 |
| tan δ | 0.012 | 0.012 | 0.042 | 0.012 | 0.092 |

The following facts are clearly recognized from Table 4.

(1) The optical disc substrates molded from the aromatic polycarbonate resin compositions according to the present invention (Examples 11 to 13) show higher transcription ratio and have less warp and shrinkage and better vibration-damping properties than the substrate molded from an aromatic polycarbonate resin alone (Comparative Example 8).

(2) The resin composition obtained by blending an ionomer resin alone in the basic resin (Comparative Example 9), although improved in vibration-damping properties, is poor in transcription ratio and proofness against warping and shrinkage.

What is claimed is:

1. An optical disk substrate which has a thickness of 0.3 to 1.5 mm as a single substrate and comprises aromatic polycarbonate resin composition comprising:

100 parts by weight of an aromatic polycarbonate resin having a viscosity-average molecular weight of 10,000 to 40,000, and 0.01 to 40 parts by weight of a biphenyl compound, an ortho-terphenyl compound or a meta-terphenyl compound or a mixture thereof.

2. An optical disk substrate according to claim 1, wherein the biphenyl compound is a compound represented by the following structural formula (1) or a mixture thereof; and the terphenyl compound is an ortho-terphenyl compound represented by the following structural formula (2) or a mixture thereof, a meta-terphenyl compound represented by the following structural formula (3) or a mixture thereof:

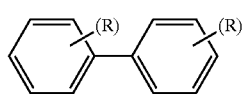
(1)

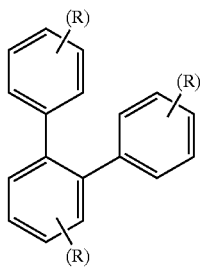
(2)

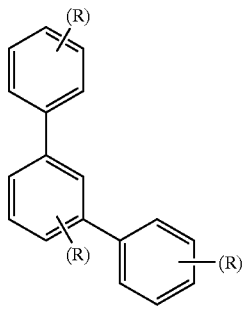
(3)

where in the structural formulas (1) to (4), R represents a hydrogen atom or a chlorine atom.

3. An optical disk substrate according to claim 1, wherein in the structural formulas (1) to (3), R is a hydrogen atom.

4. An optical disk substrate according to claim 1, wherein the aromatic polycarbonate resin composition further comprises a thermoplastic elastomer having a glass transition temperature between −50° C. and 50° C. in an amount of 0.5 to 50 parts by weight.

5. An optical disk substrate according to claim 4, wherein the thermoplastic elastomer is a styrene-isoprene-conjugated diene block copolymer containing not less than 50% by weight of 1,2-vinyl structural units, 3,4-vinyl structural units or a mixture thereof, or a hydrogenation product of said copolymer.

6. An optical disk substrate according to claim 1, wherein the aromatic polycarbonate resin composition further comprises an ethylene-unsaturated carboxylic acid copolymer which is intra-molecules crosslinked by a mono- to trivalent metal ion, in an amount of 0.5 to 50 parts by weight.

7. An optical disk substrate according to claim 6, wherein the ethylene-unsaturated carboxylic acid copolymer is a copolymer of ethylene and acrylic acid, methacrylic acid or a mixture thereof, which contains the zinc ions and has a melt index of 0.3 to 3.0 g/10 min. as measured according to ASTM D-1238.

8. An aromatic polycarbonate resin composition comprising:

100 parts by weight of an aromatic polycarbonate resin having a viscosity-average molecular weight of 10,000 to 40,000, 0.01 to 40 parts by weight of (A) a biphenyl compound represented by the following formula (1), (B) an ortho-terphenyl or a meta-terphenyl compound or (C) a mixture of a biphenyl compound (A) and a terphenyl compound (B),

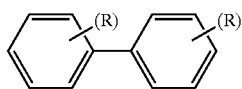 (1)

wherein the structural formula (1), R represents a hydrogen atom or a chlorine atom, and 0.5 to 50 parts by weight of a thermoplastic elastomer having a glass transition temperature between −50° C. and 50° C.

9. An aromatic polycarbonate resin composition according to claim 8, wherein the thermoplastic elastomer is a styrene-isoprene-conjugated diene block copolymer containing not less than 50% by weight of 1,2-vinyl structural units, 3,4-vinyl structural units or a mixture thereof, or a hydrogenated product of said copolymer.

10. An aromatic polycarbonate resin composition according to claim 8, further comprising an ethylene-unsaturated carboxylic acid copolymer which is intra-molecules crosslinked by a mono-to trivalent metal ion, in an amount of 0.5 to 50 parts by weight.

11. An aromatic polycarbonate resin composition according to claim 10, wherein the ethylene-unsaturated carboxylic acid copolymer is a copolymer of ethylene and acrylic acid, methacrylic acid or a mixture thereof, which contains the zinc ions and has a melt index of 0.3 to 3.0 g/10 min as measured according to ASTM D-1238.

* * * * *